United States Patent Office 3,002,396
Patented Oct. 3, 1961

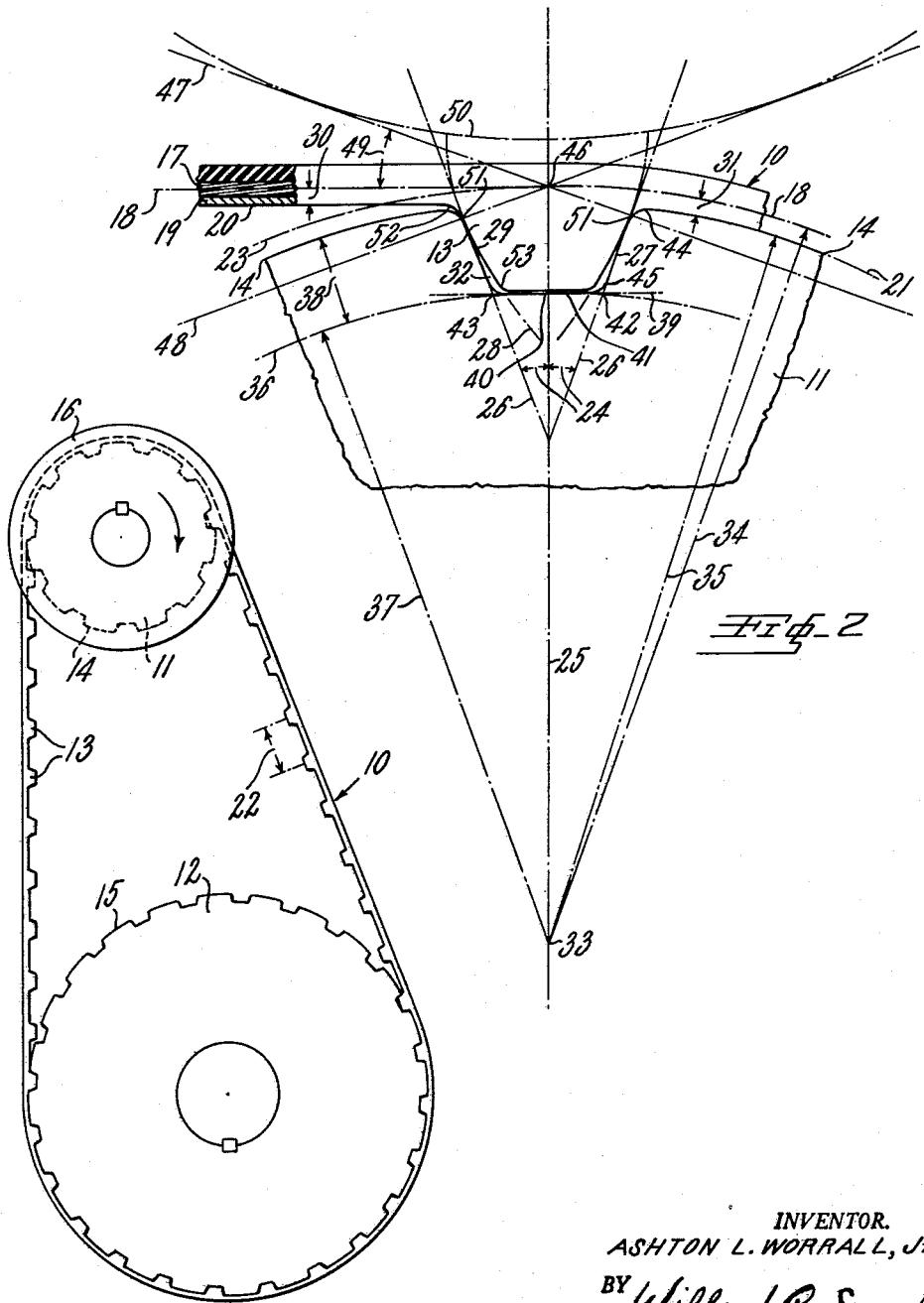

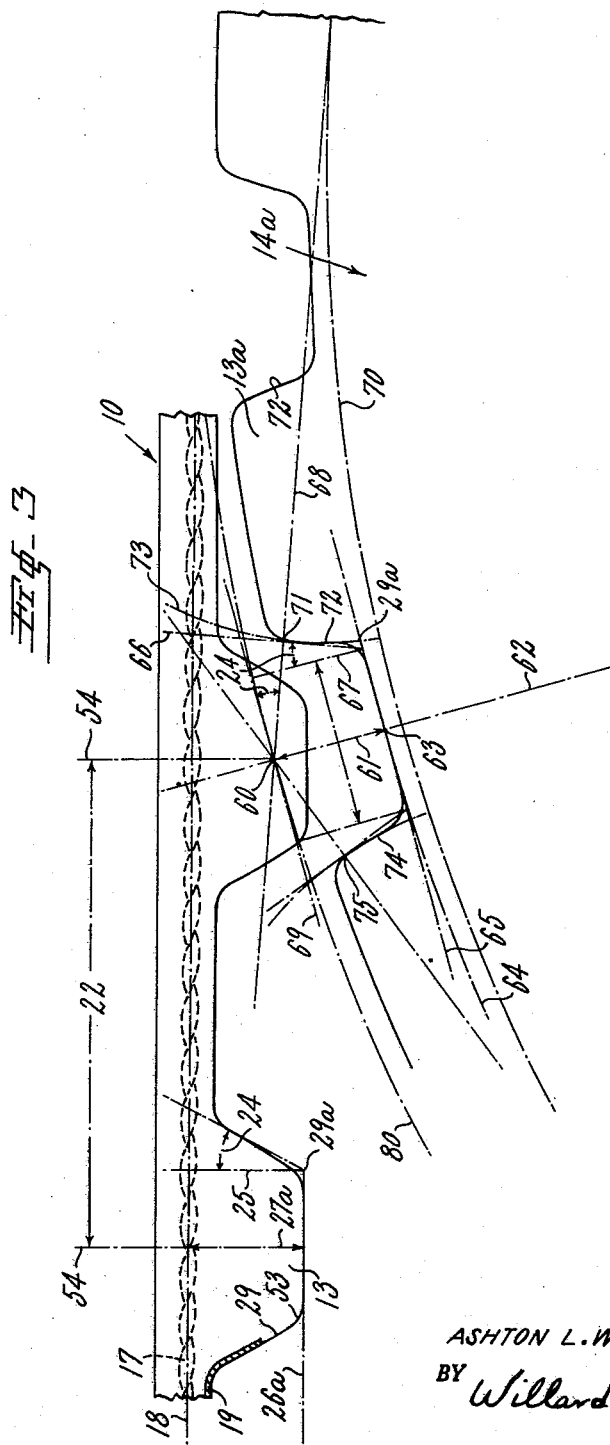

3,002,396
BELT AND GEAR DRIVE

Ashton L. Worrall, Jr., Cuyahoga Falls, Ohio, assignor to United States Rubber Company, New York, N.Y., a corporation of New Jersey
Filed Apr. 27, 1959, Ser. No. 809,283
3 Claims. (Cl. 74—229)

This application is a continuation-in-part of my co-pending applications Serial Nos. 698,112, now Patent Number 2,934,967, and 734,286, now Patent Number 2,937,538. This invention relates to a high power positive drive comprising the combination of a flexible belt and gears in which the gears are provided with teeth having involute faces which mesh with teeth on a belt with reduced interference, the teeth of the belt also having involute working faces.

The power drive embodying this invention is particularly useful for the positive transmission of power at relatively high levels between two or more gears and finds its particular importance in providing the basic transmission mechanism in an automobile, the basic automotive drive system, and may be used in place of the current direct coupled shaft systems.

One object of this invention is to obtain continuous action and to reduce interference between the teeth of the belt and of the gears in a high power transmitting application.

A further object of this invention is to reduce the noise and vibration resulting from the engagement and disengagement of the belt and gear teeth in high power applications.

This invention is further described in reference to the accompanying drawings in which:

FIG. 1 is an elevational view of a positive power drive embodying this invention;

FIG. 2 is an elevational view of a portion of the belt and the smallest gear of the power drive showing the construction of the belt teeth in reference to a straight faced gear tooth; and FIG. 3 is an enlarged side elevation of a portion of the belt having an involute tooth profile which meshes with a gear having an involute groove profile and represents the preferred embodiment of this invention.

The method of making each of the components of this power drive, namely the belt and the gear, may best be explained by referring to my co-pending applications. The construction of the belt and gear depends upon the selection of the pitch circle of the smallest pulley used in the power drive. Once the pitch circle of the smallest pulley is selected, then assuming belt teeth are straight faced, involute belt teeth are developed as explained in Serial No. 734,286. That is the conjugate involute toothed belt is developed from the straight faced toothed belt that satisfies the pitch diameter of the smallest pulley.

Summarizing the procedure thus far, the pitch circle of the smallest pulley to be used is determined and on the basis of this pitch circle, a straight faced toothed belt is laid out; from this straight faced toothed belt, it is then possible to develop the conjugate belt that will satisfy the pitch diameter of the smallest pulley. This conjugate belt will have an involute tooth profile as described in the aforesaid application.

Having therefore derived an involute profiled toothed belt from a straight faced toothed belt, it is then possible to develop an involute profiled pulley, on the basis of the straight faced toothed belt described in Serial No. 698,112.

Summarizing again, step number 1 is to determine the pitch circle of the smallest pulley. Step number 2 is to decide on the straight faced toothed belt. This belt does not have involute profiled teeth. Step number 3 is to develop the conjugate form of the straight faced toothed belt from the belt obtained at step 2 to satisfy the pitch diameter of the smallest pulley as determined at step 1. Thus far, from step 2 the conjugate belt has been derived having the involute profiled teeth. Step number 4 is to develop an involute profiled pulley from the belt obtained at step number 2.

This procedure will be explained in further detail by referring to the drawings.

As shown in FIG. 1, the power drive comprises a toothed belt 10 which transmits motion between gears 11 and 12 either of which may be the driving gear. The belt 10 is provided with teeth 13, which mesh with gear teeth 14 and 15. Means are provided for keeping the belt 10 under gears, and for that purpose as shown herein, flanges 16 are provided for the smaller gear. Except for the contour of the belt teeth face and of the gear teeth face, the belt 10 may be constructed as shown and described in United States Patent No. 2,507,852 to Richard Y. Case and may be an endless flexible plastic or rubber belt having teeth formed thereon or bonded thereto. As shown in FIG. 2 of the drawings herein, the belt 10 is provided with a load carrying or pull member 17, the center of which forms the neutral axis, or pitch line 18 of the belt. The inside, or tooth side of the belt, and the teeth thereon are covered with a fabric jacket 19, however a jacket is not essential. The exposed surface of the jacket forms the dedendum line 20 of the belt teeth 13, and when the belt goes around the gears the dedendum line 20 coincides with the addendum circle 21 of the gear.

The belt and gears of the power drive have the following characteristics, which are described in reference to gear 11. The pitch 22 of the belt teeth 13 as measured on the pitch line 18 is equal to the pitch of the gear teeth 14 and 15 as measured on their pitch circle, of which pitch circle 23 of gear 11 is representative as shown in FIG. 2. The pressure angle 24 of the belt and gear teeth is measured between a radial line 25 of any gear and pressure angle line 26, which coincides with the straight faces 27 of gear teeth 14. Gear faces 27 are tangent to involute curves 28 which form the convex face profile of the belt teeth 13. The distance 30 between the pitch line of the belt and the dedendum line 20 is equal to the distance 31 between the pitch circle 23 and the addendum circle 21. Such distances 30 and 31 are referred to as a pitch differential, and should be as small as practical.

Having selected the above mentioned characteristic, the smallest gear upon which the belt is adapted to operate is chosen and the construction of the belt teeth is then determined for conjugate operation as described hereinafter.

A portion of gear 11, the smallest gear that belt 10 is adapted to operate with, is shown at FIG. 2 having teeth 14 and a groove 32 therebetween. It is to be noted the gear shown is only diagrammatic, required only to form the belt and is not the actual gear used to drive belt 10. This gear is laid out as follows. Pitch circle 23 of gear 11 is drawn about a center 33 with a radius 34 to provide a pitch circle having a predetermined number of equally spaced grooves 32. The addendum circle is laid out with the radius 35 equal to the radius 34 of the pitch circle 23 less the pitch differential 31. The dedendum circle 36 is laid out with the radius 37 equal to the radius 35 of the addendum circle 21 less the working depth 38 of the gear teeth 14. A tangent 39 is drawn to the dedendum circle 36 at its intersection 40 with the radius 25, which passes through the center of the groove 32. One-half of the bottom width 41 of the groove 32 is laid out on the line 39 on each side of the intersection 40 to establish the corner points 42 and 43 of the groove. The angle lines 26 are then drawn through the radial points 42 and 43 at the angle 24 to the radial line 25. The extension of the lines 26 between dedendum circle 36 and the addendum circle 21 forms the straight sides or plane faces 27 of gear teeth 14. The top and bottom of the faces 27 are rounded with arcs 44 and 45 of suitable radii.

After gear 11 is diagrammatically laid out the profile of the belt teeth may be constructed as follows. Having extended the radius 25 of the gear 11 perpendicular to the pitch line 18 of the belt to form the pitch point 46, the tooth pressure or action lines 47 and 48 are drawn through the pitch point 46 at an angle 49 to the pitch line 18 of the belt 10 equal to the pressure angle 24. The base circle 50 is drawn from a center not shown on the radial line 25 outside of the pitch circle 23 of the gear 11, and with the radius equal to radius 34 of the pitch circle 23. Action lines 47 and 48 are tangent to the circle 50. The involute curves 28 are derived from base circle 50 and are tangent to the pressure angle lines 26 at the intersections 51 of the lines 26 with the lines 47 and 48; lines 26 are perpendicular to the lines 47 and 48. The working faces 29 of the belt teeth 13 are formed by that portion of the involute curves 28, which extend beyond the dedendum line 20 of the belt 10 to the dedendum circle 36 of the gear, exclusive of arcs 52 and 53 of suitable radii located at the bottom and top of the teeth.

As described herein, no clearance is provided between the belt teeth and the gear teeth. Suitable clearance may be provided in accordance with conventional practice. It is to be noted that it is only necessary to consider the design of the teeth of the belt as flat or straight in order to design the gear and in the embodiment of this invention, the belt teeth are involute. The belt that is used to determine the gear teeth is the flat or straight toothed belt from which the involute toothed belt surface has also been derived. Having laid out the belt as described heretofore, the gear 14a, shown at FIG. 3 is constructed to cooperate with the belt by first selecting pitch circle 80 of the gear so that the pitch line 18 of the belt is tangent to it. The pitch of the gear teeth must be the same as the pitch 22 of the belt teeth, and such pitch is laid out on the pitch circle 80 between the pitch centers 60 of the grooves between the teeth 13a. The addendum 27a of the belt teeth is equal to the dedendum 61 of the gear teeth, which latter is laid out along the radius 62 of the gear inwardly from the pitch point 60 of the gear groove to form a point 63 on the dedendum circle 64 of the gear 14a. It will be noted under these conditions the belt teeth are all addendum and the cooperating gear teeth are all dedendum. A tangent 65 to the dedendum circle 64 is drawn through point 63.

Now the angular outline of the belt tooth is drawn in the gear groove. To do so, the gear radius becomes the center line of the belt tooth and the tangent 65 becomes the addendum line of such tooth. One half of the width of the belt tooth is laid out along the tangent 65 from the point 63 to establish the corner 29a of the tooth. A line 66 is then drawn through the point 29a at an angle 24 to a perpendicular 67 to the tangent 65 representing the face 72 of the belt tooth. A line 68 is drawn through the pitch point 60 at the center of the gear groove so that the pressure angle 24 is included between the line 68 and a tangent 69 to the pitch circle 80 at the pitch point 60. The line 68 will be perpendicular to line 66 and tangent to the base circle 70, which is concentric to the pitch circle 80.

The base circle 70 may be also determined by computing its diameter, which is equal to the diameter of the pitch circle multiplied by the cosine of the pressure angle. Having determined its diameter, the base circle may be drawn concentric to the pitch circle 80. In such case a tangent to the base circle thus drawn and passing through the pitch point 60 will coincide with line 68.

The line 68 intersects the line 66 (representing the face of a belt tooth) at the point 71, which establishes a point on the involute profiled face of the gear tooth. The contour of the involute profiled face 72 of the gear tooth is formed by plotting the path of the point 71 under the condition that it is on a flexible member such as a string, attached to the base circle 70 at the point of tangency of the line 68 to the circle, and the string is wound counterclockwise under tension around the circle 70 until the path 73 of the point 71 intersects the dedendum circle 64.

The involute profiled face 74 for the other side of the tooth is determined in the same manner as the face 72, excepting after locating the point 75 corresponding to the point 71, the involute profiled face 72 is determined by tracing the path of the point 75 on a flexible member tangent to the base circle 70 when wound clockwise around the circle. The opposite faces of all the gear teeth may be determined in the same manner.

As shown and described herein no clearance is provided in the gear teeth grooves for the belt teeth, but suitable clearance should be provided to compensate for manufacturing inaccuracies.

Having laid out the belt and gear drive as described herein, those skilled in the art may produce the belt and gear by well known conventional methods of molding and gear cutting.

The preferred form of this invention has been described herein, but changes may be made therein without departing from the spirit of the invention, and it is intended to cover all such changes coming within the scope of the appended claims and such changes as may occur to those skilled in the art.

Having thus described my invention, what I claim and desire to protect by Letters Patent is:

1. A high power positive drive comprising a flexible toothed belt and gears therefor having teeth on their peripheries adapted to mesh with said belt, said belt teeth and gear teeth having working faces of an involute contour and predetermined pressure angle, the pitch circles for said gears lying respectively outside the tops of said gear, the involute profile for the teeth of each gear being derived from a base circle having a diameter determined by multiplying its pitch circle diameter by the cosine of the pressure angle, the involute profile for said belt teeth being derived from a base circle having a diameter determined by multiplying the pitch circle diameter of the smallest gear by the cosine of the pressure angle.

2. In combination, an endless flexible toothed belt, the contour of the teeth thereon being involute, and gears therefor adapted to drive and be driven by said belt, said gears having peripheral teeth of involute contour.

3. A high power positive drive comprising a flexible toothed belt having a tension member located substantially at the neutral axis, gears therefor having teeth on their peripheries and being adapted to mesh with said belt, said belt teeth and the gear teeth of at least one gear having working faces of an involute contour and predetermined pressure angle, the pitch circles for said gears lying respectively outside the tops of said gears, said neutral axis coinciding with said pitch circles where said axis curves around said gears, the involute profile for the teeth of each gear being derived from a base circle having a diameter determined by multiplying its pitch circle diameter by the cosine of the pressure angle, the involute profile for said belt teeth being derived from a base circle having a diameter determined by multiplying the pitch circle diameter of the smallest gear by the cosine of the pressure angle.

References Cited in the file of this patent

UNITED STATES PATENTS 2,507,852   Case _____ May 10, 1950

OTHER REFERENCES

"The Involute Gear," published by "The Fellows Gear Shaper Co., Springfield, Vermont (copyright 1920), pages relied on 19, 20, 33 and 34.